United States Patent [19]

Schultz

[11] 4,177,795
[45] Dec. 11, 1979

[54] TRIGGERING DEVICE RESPONSIVE TO ENERGY FLOW AND CONTROLLED SOLAR HEATING SYSTEM INCORPORATING THE DEVICE

[76] Inventor: Robert T. Schultz, 1021 Cliff Dr., Santa Barbara, Calif. 93109

[21] Appl. No.: 823,572

[22] Filed: Aug. 11, 1977

[51] Int. Cl.² .............................................. F24J 3/02
[52] U.S. Cl. ................................. 126/419; 136/89 PC
[58] Field of Search ............... 126/270, 271; 237/1 A; 136/89 AC; 307/310, 313; 73/362 AR

[56] References Cited

U.S. PATENT DOCUMENTS

| | | | |
|---|---|---|---|
| 3,436,564 | 4/1969 | Enders | 307/310 |
| 3,583,224 | 6/1971 | Futaki | 73/362 AR |
| 3,986,489 | 10/1976 | Schlesinger | 126/271 |
| 4,019,495 | 4/1977 | Frazier | 237/1 A |

OTHER PUBLICATIONS

J. T. Czarnecki et al., "Advances in Solar Water Heating for Domestic Use in Australia," Solar Energy, vol. 20, pp. 75-80 (1978).

Primary Examiner—James C. Yeung
Attorney, Agent, or Firm—Nilsson, Robbins, Dalgarn, Berliner, Carson & Wurst

[57] ABSTRACT

A device, and controlled solar heating system incorporating the device, for providing an electrical control signal responsive to the rate of flow of species of radiant energy through an area. The device includes means for providing an electrical input signal responsive to the rate of flow of the species of radiant energy, such as solar energy, and an electrical circuit for receiving the input signal and for providing a control signal in response to the input signal. Solar cells may provide the input signal to a Schmidt Trigger Circuit set to provide two control signals at predetermined rates of solar energy flow through an area. The device, incorporated into a solar heating system, may be used to control the circulation of fluid through solar heating panels.

38 Claims, 3 Drawing Figures

U.S. Patent  Dec. 11, 1979  4,177,795
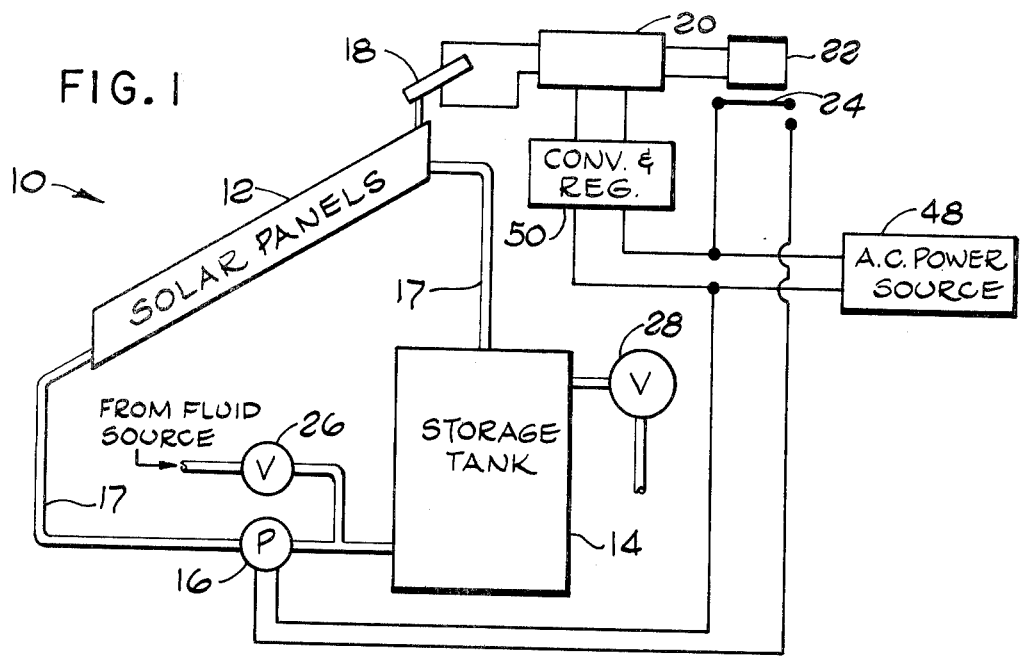
FIG. 1
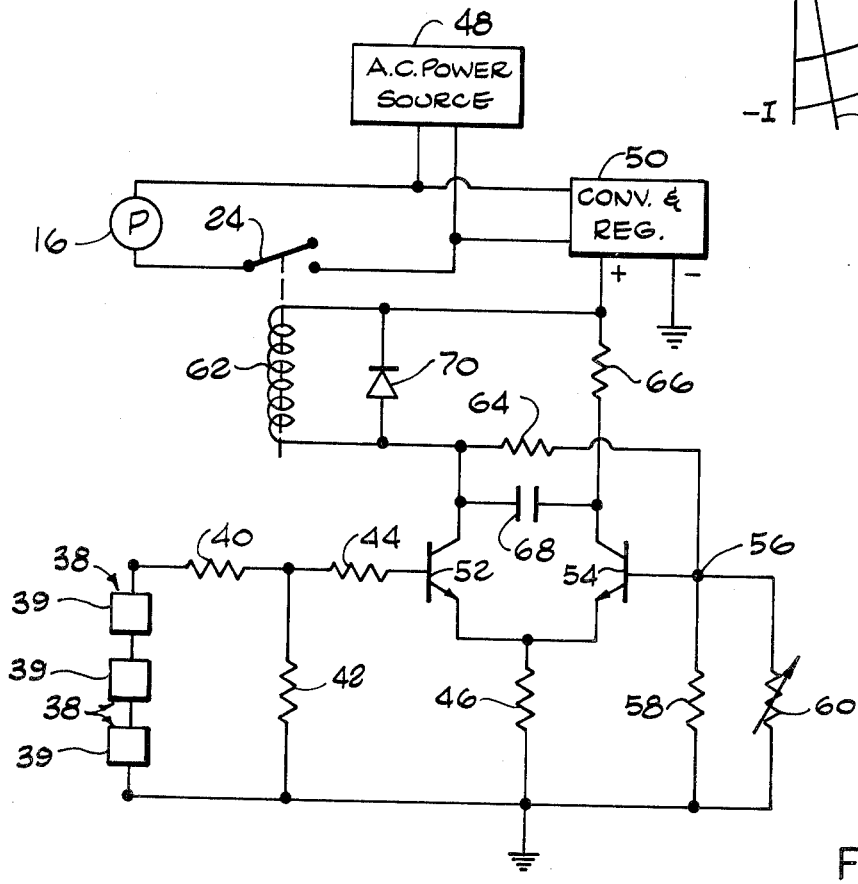
FIG. 2
FIG. 3

TRIGGERING DEVICE RESPONSIVE TO ENERGY FLOW AND CONTROLLED SOLAR HEATING SYSTEM INCORPORATING THE DEVICE

BACKGROUND OF THE INVENTION

A. Field of Invention

The invention relates to solar heating systems and to devices for sensing the availability of energy and for providing control signals in response thereto.

B. Description of Prior Art

Solar heating systems which utilize solar heating panels for absorbing solar energy and transferring the energy to a fluid being circulated through the panels are common. Such systems in general require a device for sensing whether or not sufficient energy is available to obtain a transfer of energy in the desired direction and to justify the expenditure of energy in the circulation of the fluid.

Indirect methods and devices employing such methods for sensing the availability of sufficient energy and controlling circulation based on such sensing are in common use. Typical examples are methods and devices: (1) dependent upon the sensing of the temperature of the fluid in the heating panels or the differential temperature between the fluid in the panels and in a storage tank (or at a position in a storage tank) or similar location; and (2) dependent upon the sensing of the air temperature near a solar heating panel or the differential air temperature between a position near the solar heating panel and a position in or near the location where heating is desired.

Sensing and means for sensing the availability of solar energy in a solar heating system is broadly disclosed in Wright U.S. Pat. No. 3,906,928, along with very elementary circuitry; however, the specific embodiment for a sensor which is disclosed apparently is a temperature sensing device—a thermal switch. The use of photosensitive devices in units using solar heat is disclosed in Minnick U.S. Pat. No. 3,981,295 and Harris, Jr. et al U.S. Pat. No. 3,620,206.

Electrical circuits for providing control signals in response to temperature are used in various applications, as shown for example in Futaki U.S. Pat. Nos. 3,583,224, Gardner et al U.S. Pat. No. 3,413,438 and Enders U.S. Pat. No. 3,436,564.

SUMMARY OF THE INVENTION

A triggering device for providing an electrical control signal responsive to the rate of flow of species of radiant energy through an area. The device includes means for providing an electrical input signal responsive to the rate of flow of the species of radiant energy through the area and an electrical circuit for receiving the input signal and for providing a control signal in response to the input signal. The device may use solar cells for sensing and providing an input and a Schmidt Trigger Circuit for receiving the input and for providing a control signal. A solar heating system, including solar heating panels, means for circulating the fluid through the panels and means for switching on and off said circulation, may incorporate the device as a control for the means for switching.

BRIEF DESCRIPTION OF THE DRAWINGS

FIG. 1 is a diagrammatic view of a controlled solar heating system in accordance with the invention.

FIG. 2 is a graph of typical current versus voltage curves for a solar cell at various rates of flow of solar energy per unit area, and a graph of a typical load line connected across the solar cell.

FIG. 3 is a schematic circuit diagram of a triggering device in accordance with the invention incorporated into the system of FIG. 1.

DETAILED DESCRIPTION

Key elements of a controlled solar heating system 10 in accordance with the invention, shown in FIG. 1, include: a number of solar heating panels 12; a means 18 for sensing the rate of flow of solar energy through an area in the vicinity of the panels; a storage tank 14 with, when the system is in operation, the hottest fluid near the top; a pump 16 for pumping fluid through the panels, storage tank and pipes 17; a triggering circuit, represented by the blocks designated 20 and 22, responsive to the sensor means; and a switch 24 for turning on and off the pump in response to the control signals from the triggering circuit 20 and 22.

Apart from the operation of the sensor means 18 and triggering circuit, represented by the blocks 20 and 22, said sensor means and triggering circuit together comprising a triggering device, the operation of the heating system can be readily perceived from FIG. 1. A fluid, in the form of cold water, can be introduced into the circulation system through an input valve 26 connecting said system to an external source, such as a city water system. Heated water can be removed from the circulation system for use through an output valve 28 for removing water from near the top of the storage tank 14. When the switch 24 is closed, water circulates through the panels 12 as well as through the remainder of the circulation system. When the switch is open, the pump is not in operation, and the circulation, for the purpose of transferring energy from the sun to the water, is not operative.

The triggering circuitry, in the blocks 20 and 22, provides a control signal in response to the output of the means for sensing 18. In the embodiment of FIG. 1, the sensing means 18 employs solar cells as the sensing element.

A solar cell is essentially a photodiode with no bias voltage applied across it. Typical voltage versus current characteristics for a solar cell, at various rates of input of solar energy per unit area (measured at a cell surface for receiving the energy) are shown in FIG. 2. Also shown, is a voltage versus current characteristic for a typical resistor load connected across the solar cell. The curves 30, 32 and 34 represent increasing rates of flow across the receiving surface of the solar cell. Line 36 is the load line. From the graphs, it is evident that a resistor connected across the solar cell which will result in a load line near the "I" axis, provides a good means for monitoring the rate of flow of solar energy incident on the receiving surface of the solar cell. A potential of approximately 0.5 volts is a typical open circuit voltage for a solar cell which is fully radiated.

FIG. 3 shows three solar cells 38, employed as the sensing element in the sensing means 18 of FIG. 1, at the input of the triggering circuit represented as the blocks 20 and 22 in FIG. 1. The solar cells respond in the manner indicated by the curves 30, 32 and 34 of FIG. 2 to the rate of flow of solar energy per unit area incident at their surfaces 39, with the voltage and current for the three cells in series approximating the summation of the curves for each of the cells. The resistors 40, 42, 44 and 46 are chosen so that the resistance of the resistor 40 in series with the resistor 42 approximates the input resistance seen by the solar cells. Thus the resistance of the resistor 40 in series with the resistor 42 substantially determines the slope of the load line, such as the line 36, for the cells. The circuit is a Schmidt Trigger Circuit having a configuration which is well known to those skilled in the art. Its method of operation is similarly well known.

With the input transistor 52 off and the reference transistor 54 on, a reference voltage is established at the reference node 56. The solenoid 62 (which has a resistance), a resistor 64, and a resistor 58 in parallel with a potentiometer 60, act as a voltage divider which establishes the reference voltage. With the input transistor 52 off and the reference transistor 54 on, the current through the solenoid 62 is not of sufficient magnitude to provide a magnetic field which is strong enough to close the switch 24. Thus, the pump 16 is not in operation.

The rate of flow of solar energy incident at the surfaces 39 of the solar cells 40, through the electrical output of the solar cells, will determine the voltage across the resistor 42. Still assuming the input transistor 52 is off and the reference transistor 54 is on, when the rate of flow of solar energy rises to a level sufficient to establish a certain predetermined voltage across said resistor, said level being in the vicinity of the reference voltage, the input transistor 52 will turn on and the reference transistor 54 will turn off. As a result, the current through the solenoid 62 will reach a level sufficient to provide a magnetic field which in turn is sufficient to close the switch 24. When the switch 24 closes, the pump 16 will turn on and circulation through the solar heating panels will commence.

With the input transistor 52 turned on and the reference transistor 54 turned off and with the rate of flow of solar energy falling, a second predetermined voltage across the resistor 42, also in the vicinity of the aforementioned reference voltage, translates to a predetermined rate of flow of solar energy at which the transistor 52 will turn off and the reference transistor 54 will turn on. As a result, the switch 24 will open, the pump will be disconnected and the circulation will cease.

The difference between the voltage across the resistor 42 at which the input transistor 52 turns on and the voltage at which it turns off is due to the well known phenomenon of hysteresis. As indicated, this hysteresis is used in the design of the device shown in FIG. 2 to provide for the commencement and termination of circulation at different predetermined rates of flow of solar energy. A design which provides for a turn on rate of approximately 0.5 langleys per minute and a turn off rate of approximately 0.4 langleys per minute has proved efficient in the embodiment of a controlled solar heating system shown in FIG. 1. The predetermined levels may, of course, be varied.

Again referring to FIG. 3, the ac to dc converter and voltage regulator block 50, provides a bias voltage for the Schmidt Trigger Circuit. The ac source, which is a line source, supplies power to the pump as well as to the Schmidt Trigger Circuit. The capacitor 68 across the collectors of the transistors 52 and 54 reduces oscillation, and the shunt diode 70 is to protect the input transistor 52 from being burned out when there is a large decrease in current through the solenoid 62.

Although solar cells have been shown as the element for sensing the rate of flow of energy and for providing an input signal, and a Schmidt Trigger Circuit has been shown as the electrical circuit for receiving the input signal and providing a control signal, it is evident that the invention encompasses other means for receiving species of radiant energy and providing an input signal and other circuits for receiving said input signal and providing a control signal.

It will also be appreciated that the description of the embodiments of the invention that has been given is by way of illustration and modifications in detail may be made without departing from the spirit of the invention.

What is claimed is:

1. A system for controlled solar heating of a fluid, comprising:
    (A) a panel for collecting solar energy and transferring said energy to the fluid;
    (B) means for circulating the fluid through said panel to receive said energy;
    (C) means responsive to the rate of flow of solar energy through an area in the vicinity of said panel for providing a control signal;
    (D) means for switching on and off said circulation of said fluid through said panel in response to said control signal.

2. A solar heating system as defined in claim 1 wherein said means for providing a control signal comprises:
    (A) means for providing an electrical input signal responsive to said rate of flow of solar energy; and
    (B) an electrical circuit for receiving said input signal and for providing said control signal.

3. A solar heating system as defined in claim 2 wherein said means for providing an input signal comprises at least one solar cell.

4. A solar heating system as defined in claim 2 wherein said means for providing an input signal comprises at least three solar cells.

5. A solar heating system as defined in claim 2 wherein said electrical circuit is set to provide a control signal for turning on said circulation when said rate of flow rises to a first predetermined level and a control signal for turning off said circulation when said rate of flow falls to a second predetermined level.

6. A solar heating system as defined in claim 5 wherein said predetermined level is approximately 0.5 langleys per minute.

7. A solar heating system as defined in claim 5 wherein said second predetermined level is approximately 0.4 langleys per minute.

8. A solar heating system as defined in claim 2 wherein said circuit comprises a Schmidt Trigger Circuit.

9. A solar heating system as defined in claim 2 wherein:
    (A) said means for providing an input signal comprises at least one solar cell; and
    (B) said circuit comprises a Schmidt Trigger Circuit.

10. A solar heating system as defined in claim 9 wherein said means for providing an input signal comprises at least three solar cells.

11. A solar heating system as defined in claim 9 wherein said Schmidt Trigger Circuit is set to provide a control signal for turning on said circulation when said rate of flow rises to a first predetermined level and a control signal for turning off said circulation when said rate of flow falls to a second predetermined level.

12. A solar heating system as defined in claim 11 wherein said first predetermined level is approximately 0.5 langleys per minute.

13. A solar heating system as defined in claim 11 wherein said second predetermined level is approximately 0.4 langleys per minute.

14. A solar heating system as defined in claim 1 wherein said means for switching comprises:
   (A) a solenoid for providing a signal responsive to said control signal; and
   (B) a switch that opens and closes in response to said solenoid signal.

15. A solar heating system as defined in claim 1 wherein said means for circulating comprises a pump and pipes for said fluid.

16. A solar heating system as defined in claim 15 wherein said means for switching comprises:
   (A) a solenoid for providing a signal responsive to said control signal; and
   (B) a switch for connecting and disconnecting electrical power to said pump in response to said solenoid signal.

17. A solar heating system as defined in claim 1 wherein said means for circulation comprises a fluid storage tank.

18. A system for controlled solar heating of a fluid, comprising:
   (A) a panel for collecting solar energy and transferring said energy to the fluid;
   (B) means for circulating the fluid through said panel to receive said energy;
   (C) at least one solar cell for sensing the availability of solar energy in the vicinity of said panel and for providing an electrical input signal in response to said availability; and
   (D) a Schmidt Trigger Circuit for receiving said input signal and for providing a control signal in response to said input signal; and
   (E) means for switching on and off said circulation of said fluid through said panel in response to said control signal.

19. A solar heating system as defined in claim 18 wherein at least three solar cells are used for sensing said availability and for providing said input signal.

20. A solar heating system as defined in claim 18 wherein said Schmidt Trigger Circuit is set to provide a control signal for turning on said circulation when said availability rises to a first predetermined level and a control signal for turning off said circulation when said availability falls to a second predetermined level.

21. A triggering device for providing an electrical control signal responsive to the rate of flow of species of radiant energy through an area, comprising:
   (A) means for providing an electrical input signal responsive to the rate of flow of the species of radiant energy through the area; and
   (B) an electrical circuit for receiving said input signal and for providing a control signal in response to said input signal.

22. A triggering device as defined in claim 21 wherein said species of radiant energy comprises solar energy.

23. A triggering device as defined in claim 22 wherein said means for providing an input signal comprises at least one solar cell.

24. A triggering device as defined in claim 21 wherein said means for providing an input signal comprises at least three solar cells.

25. A triggering device as defined in claim 21 wherein said electrical circuit is set to provide a first control signal when said rate of flow rises to a first predetermined level and to provide a second control signal when said rate of flow falls to a second predetermined level.

26. A triggering device as defined in claim 25 wherein said species of radiant energy is solar energy.

27. A triggering device as defined in claim 26 wherein said first predetermined level is approximately 0.5 langleys per minute.

28. A triggering device as defined in claim 26 wherein said second predetermined level is approximately 0.4 langleys per minute.

29. A triggering device as defined in claim 21 wherein said circuit comprises a Schmidt Trigger Circuit.

30. A triggering device as defined in claim 29 wherein said Schmidt Trigger Circuit is set to provide a first control signal when said rate of flow rises to a first predetermined level and to provide a second control signal when said rate of flow falls to a second predetermined level.

31. A triggering device as defined in claim 21 wherein:
   (A) said species of radiant energy is solar energy;
   (B) said means for providing an input signal comprises at least one solar cell; and
   (C) said circuit comprises a Schmidt Trigger Circuit.

32. A triggering device as defined in claim 31 wherein said means for providing an input signal comprises at least three solar cells.

33. A triggering device as defined in claim 31 wherein said Schmidt Trigger Circuit is set to provide a first control signal when said rate of flow rises to a first predetermined level and to provide a second control signal when said rate of flow falls to a second predetermined level.

34. A triggering device as defined in claim 33 wherein said first predetermined level is approximately 0.5 langleys per minute.

35. A triggering device as defined in claim 33 wherein said second predetermined level is approximately 0.4 langleys per minute.

36. A triggering device for providing an electrical control signal responsive to the availability of solar energy at a location, comprising:
   (A) at least one solar cell for sensing the availability of solar energy at the location and for providing an electrical input signal in response to said availability; and
   (B) a Schmidt Trigger Circuit for receiving said input signal and for providing a control signal in response to said input signal.

37. A triggering device as defined in claim 36 wherein at least three solar cells are used for sensing said availability and for providing said input signal.

38. A triggering device as defined in claim 36 wherein said Schmidt Trigger Circuit is set to provide a first control signal when said availability rises to a first predetermined level and to provide a second control signal when availability falls to a second predetermined level.

* * * * *